United States Patent [19]

Dilbert et al.

[11] Patent Number: 4,582,695

[45] Date of Patent: Apr. 15, 1986

[54] PROCESS FOR PRODUCING CARBON BLACK

[75] Inventors: Meredith N. Dilbert; Glenn J. Forseth; William R. Jones, all of Bartlesville; Richard T. Divis, Ochelata, all of Okla.

[73] Assignee: Phillips Petroleum Company, Bartlesville, Okla.

[21] Appl. No.: 652,027

[22] Filed: Sep. 19, 1984

[51] Int. Cl.$^4$ .................... C01B 31/02; C09C 1/48
[52] U.S. Cl. ................... 423/450; 423/449; 423/457; 422/150
[58] Field of Search ............ 423/450, 449, 455, 456, 423/457; 422/150

[56] References Cited

U.S. PATENT DOCUMENTS

| | | | |
|---|---|---|---|
| 2,616,795 | 11/1952 | Krejci | 423/456 |
| 3,877,876 | 4/1975 | Cheng | 423/456 |
| 3,952,087 | 4/1976 | Antonsen et al. | 423/450 |
| 4,046,864 | 9/1977 | Cheng | 423/456 |
| 4,216,193 | 8/1980 | Vanderveen et al. | 423/450 |
| 4,289,743 | 9/1981 | Ruble | 423/450 |
| 4,315,901 | 2/1982 | Cheng et al. | 423/455 |
| 4,339,422 | 7/1982 | Cheng | 423/456 |
| 4,391,789 | 7/1983 | Estopinal | 423/450 |

FOREIGN PATENT DOCUMENTS 0102072  3/1984  European Pat. Off. .

Primary Examiner—Gregory A. Heller
Attorney, Agent, or Firm—John R. Casperson

[57] ABSTRACT

A reactor for the production of carbon black is disclosed which is characterized by axial flow of combustion gases and sequential converging sections for sequentially accelerating the hot combustion gases used to drive the pyrolysis reaction.

6 Claims, 3 Drawing Figures

PROCESS FOR PRODUCING CARBON BLACK

BACKGROUND OF THE INVENTION

In one aspect, the invention relates to the production of carbon black. In another aspect, the invention relates to a furnace which is especially well adapted for producing carbon black.

In furnace processes for the production of carbon black, a carbonaceous make oil is pyrolyzed with hot combustion gases formed by combusting a fuel, such as natural gas or residual oil with an oxidant, usually air. The carbon forming reaction occurs in a refractory lined tunnel which constitutes the bulk of the reactor. Different grades of carbon black are produced by manipulating the amount of fuel, oxidant and carbonaceous feed introduced into the reactor, the positions at which they are introduced, and the interior dimensions of the reactor tunnel. Reactors in which the properties of the carbon black produced can be relatively independently manipulated are very desirable. Reactors in which the production of undesired product, such as grit, is maintained at a low level are very desirable. Reactors characterized by a high degree of thermal efficiency are very desirable.

OBJECTS OF THE INVENTION

It is an object of this invention to provide an apparatus and process for producing carbon black in which the properties of the carbon black are easily controlled by manipulating input parameters.

It is another object of this invention to provide an apparatus and process for the production of carbon black having low levels of grit contaminant.

It is a further object of this invention to provide a process and apparatus for the production of carbon black in which the reactants come together to produce carbon black in a highly efficient manner.

SUMMARY OF THE INVENTION

In one aspect, the invention relates to a carbon black reactor. A tunnel through the reactor defines a reaction flow path in which the carbon black is produced. The tunnel is divided into several zones. As the hot gases flow through the tunnel, they pass through a first generally cylindrical zone, a first converging zone, a second generally cylindrical zone of smaller diameter than the first generally cylindrical zone, a reactor throat which is formed by a third generally cylindrical zone, and a pyrolysis zone which is defined by a fourth generally cylindrical zone which has a greater diameter than the diameter of the reactor throat. The reactor is provided with a means for establishing generally axial flow of hot combustion gases, a means for introducing a carbonaceous feedstock generally radially inwardly into the hot combustion gases for decomposition to form the carbon black, and, at the end of the pyrolysis zone, a means for the introduction of a quench fluid to terminate the carbon forming reaction.

In another aspect, the invention relates to a process for the production of carbon black. Hot combustion gases are caused to flow generally longitudinally along the reaction flow path and are subjected to two sequential stages of acceleration. The twice accelerated combustion gases are then introduced into a third stage where rapid deceleration occurs. The carbonaceous feedstock is introduced generally radially inwardly into the first acceleration zone to initiate the carbon forming reaction.

DETAILED DESCRIPTION OF THE INVENTION

Figure 1:
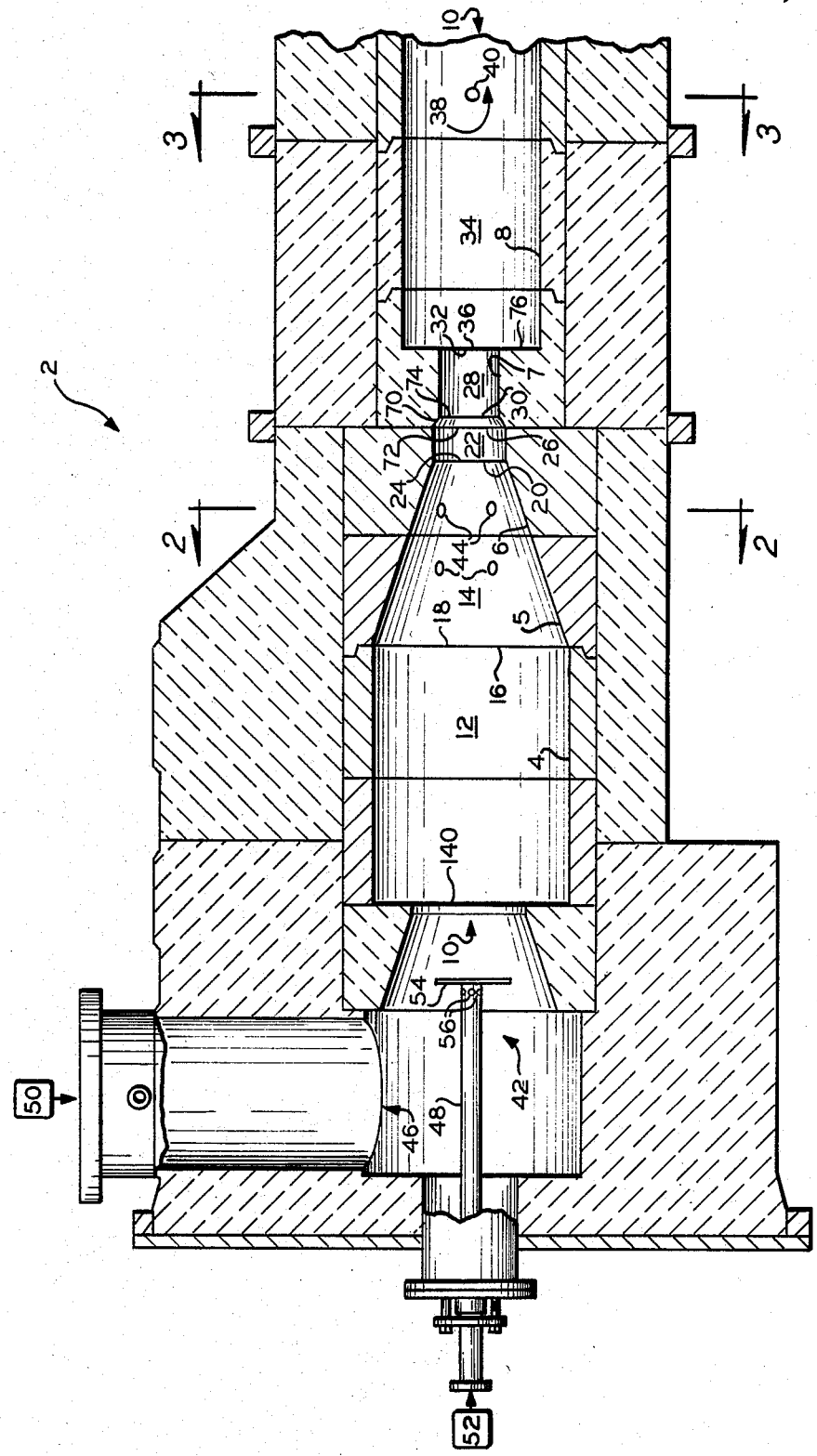
FIG. 1 is a side sectional representation of carbon black reactor embodying certain features of the present invention.

According to certain aspects of the invention, a carbon black reactor designated generally by the reference numeral 2 is formed to a large extent by refractory sections 4, 5, 6, 7 and 8 which define a tunnel 10 which defines the reaction flow path through the reactor 2.

In a preferred embodiment, the tunnel 10 has the following zones in sequential, general axial alignment. A first generally cylindrical zone 12 has a first end 140 and a second end 16. A first converging zone 14 has a first end 18 connected to the second end 16 of the zone 12, and a second end 20. A second generally cylindrical zone 22 has a first end 24 connected to the second end 20 of the converging zone 14 and a second end 26. A third generally cylindrical zone 28 has a first end 30 which connects via a suitable means with the second end 26 of the zone 22 and a second end 32. The third generally cylindrical zone 28 has a diameter less than the diameter of the second generally cylindrical zone 22 and forms the throat of the tunnel 10. A fourth generally cylindrical zone 34 has a first end 36 connected to the second end 32 of the zone 28, and a second end 38. The second end 38 of the zone 34 is determined by the position of a means 40 for introducing a quench fluid into the zone 34, which serves as the pyrolysis zone for the reactor. The reactor further comprises a means designated generally by the numeral 42 for establishing a generally axial flow of hot combustion gases which flow from the first generally cylindrical zone 12 to the fourth generally cylindrical zone 34 and means designated generally by the reference numeral 44 for introducing a carbonaceous feedstock generally radially inwardly into the hot combustion gases along the reaction flow path.

In one embodiment, the means 42 has a radial air plenum 46 and an axial fuel tube 48. The air plenum 46 is connected to a source of oxidizing gas source 50 which has preferably been preheated such as by indirect heat exchange with reactor tail gases. The fuel tube 48 is connected with a suitable source of fuel 52 such as natural gas. A circular plate 54 seals the end of the fuel tube 48 and forms an annular flange with respect to the tube 48, the downstream face of which acts as a flame holder. Fuel is emitted from the tube 48 through apertures 56 located near flange 54.

Figure 3:
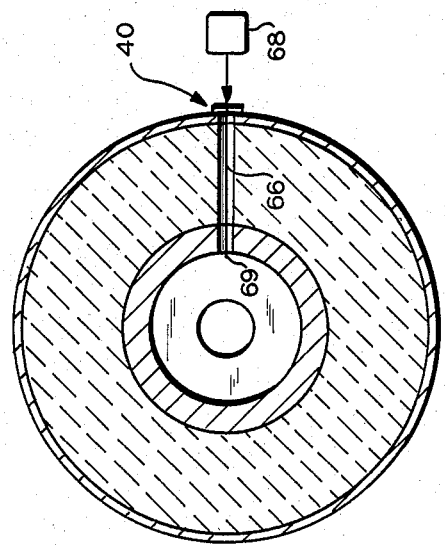
FIG. 3 represents a cross sectional view of the reactor of FIG. 1 as would appear when viewed along lines 3—3.
Figure 2:
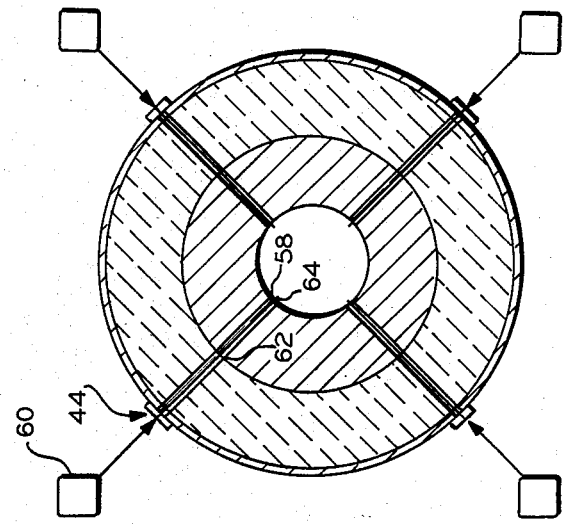
FIG. 2 represents a cross sectional view of the reactor of FIG. 1 as would appear when viewed along lines 2—2.

With reference to FIGS. 2 and 3, the means 44 for introducing the carbonaceous feedstock generally comprises at least one spray injector 58 positioned in the converging zone 14 of the reactor 2 and oriented generally radially inwardly toward the axis of the reactor. In a preferred embodiment, four spray injectors 58 are used at either of two sets of ports at different longitudinal positions in the converging zone 14 of the reactor. A source of carbonaceous feedstock 60 is connected to each of the spray injectors 58. Usually, the source 60 will comprise a storage tank, a pump capable of generating a pressure of at least 50 psig, usually in the range of from 100 to 500 psig, and a heater for preheating the carbonaceous feedstock to a temperature in the range of from about 200° F. to about 600° F. The spray injector 58 can be formed from a tubular member 62 which extends through the reactor sidewall and preferably has a spray nozzle 64 mounted on its end because selection of spray angle provides higher yield and an additional parameter which can be manipulated to influence product properties. Generally, the spray nozzle will emit a cone shaped spray or dispersion of feedstock which diverges at an angle in the range of from about 15° to about 120°, preferably in the range of from about 30° to about 100°. Oil pressure and/or nozzle orifice size are adjusted so that the feedstock emitted from the injector 58 does not impinge on the opposite wall and cause coke buildup or excessive grit in the final product.

The means 40 for introducing a quench fluid into the pyrolysis zone generally comprises a tubular member 66 extending through the sidewall which defines the pyrolysis zone 34 usually in a generally radially inward direction. The tubular member 66 is connected to a suitable source 68 of quench fluid, usually water since it is convenient and effective. Where water is used as a quench fluid, the tube 66 will generally be provided with a spray nozzle 69 at its outlet end having an orifice size and a spray angle sufficient to cool the effluent in the pyrolysis zone to below carbon carbon forming temperatures without excessive impingement on the far wall of the reactor.

Although the size of the reactor throat is not critical in the present invention, commercial sized reactors constructed in accordance with the present invention will usually have a throat 28 diameter in the range of from about 4 inches to about 16 inches, usually between about 5 inches and about 10 inches. The size of the throat will be related to the capacity of the air source 50. Generally, a relationship between the throat 28 and the means 50 will be such that the volume of hot combustion gases at a 50 percent excess air rate as measured at standard temperature and pressure conditions will be between about 10,000 $r^{2.3}$ and about 14,000 $r^{2.3}$, where r is the radius of the reactor throat 28 in inches. Sufficient oil is introduced so as to maintain an air/oil ratio in the range of 200 to 800, depending on the desired product. The generally cylindrical zone 12 will generally have a diameter in the range of from about 2 to about 5 throat diameters, usually between about 2.5 and about 3.5 throat diameters. It is preferred that the diameter of the zone 12 be toward the larger end of the described ranges where a liquid fuel is to be used. The length of the generally cylindrical zone 12 should be sufficient to provide for the desired degree of combustion of the fuel used with the oxidant gas. Usually, the zone 12 will have a length of at least 2 times the throat diameter, usually in the range of from about 2 to about 10 times the throat diameter.

The generally cylindrical zone 22 generally has a diameter in the range of from about 1.1 to about 2 throat diameters and a length in the range of from about 0.2 to about 2 throat diameters.

The converging zone 14 is preferably formed from a frustoconical reactor section having an included cone angle in the range of from about 30° to about 90°, preferably from about 45° to about 80°. The length of the converging section 14 is, of course, dependent upon the included cone angle and the respective diameters of the zones 12 and 22 but will generally be in the range of from about 2 to about 10 throat diameters.

The throat 28 will generally have a length in the range of 0.3 to about 3 throat diameters, usually from about 0.5 to about 2 throat diameters. It is connected to the zone 22 by a suitable wall means. A second converging section 70 having a first end 72 abutting the second end 26 of the zone 22 and a second end 74 abutting the end 30 of the zone 28 can be provided if desired, or an annular connection can be used. However, where an annular connection is used the erosion which will probably occur in use can cause it to become a converging zone.

Preferably, a generally annular end wall 76 connects the zone 28 with the zone 34. The zone 34 generally has a diameter in the range of from about 2 to 5 throat diameters, usually in the range of from about 2 to about 4 throat diameters. The reactor refractory can be cast in sections along the lines as generally indicated in the FIG. 1 and separated with expansion paper as is known to those of ordinary skill. The reactor tunnel can be lined with chrome alumina refractory at its upstream end around the zones 12 and 14 as well as for the downstream portions of the zone 34. The throat 28 and upstream end of the zone 34 can be formed from a high alumina rammable refractory such as Jade Pak 88P available from A. P. Green. The refractory surrounding the air plenum and fuel inlet of the upstream end of the reactor can be formed from Kaokast refractory available from Babcock and Wilcox and Purotab refractory which is higher alumina content than Kaokast can be used to insulate the tunnel liner. One-half inch steel can be used for the reactor shell.

In another aspect of the invention there is provided a process for producing carbon black comprising forming a stream of hot combustion gases flowing generally longitudinally along a reaction flow path, accelerating said hot combustion gases in a first stage to form once accelerated hot combustion gases; flowing the once accelerated hot combustion gases into a second stage where said combustion gases are further accelerated to form twice accelerated combustion gases. The hot combustion gases are then flowed into a third stage where abrupt deceleration occurs. The carbonaceous feedstock is introduced generally radially inwardly into the first acceleration zone. The process can be practiced in an apparatus as shown in FIG. 1, for example, where the zone 14 constitutes the first acceleration zone, the zone 70 constitutes the second acceleration stage, and the zone 34 constitutes the third stage. Quench fluid such as water is introduced via the means 40 to be contacted with the abruptly decelerated hot combustion gases to terminate the carbon forming reaction. In order to provide a desirable residence time under high turbulence condition, the hot combustion gases are preferably flowed through a reactor throat between the second acceleration stage and the deceleration stage. The deceleration preferably occurs during the active carbon forming reaction preferably at a distance within the range of from about 2 to about 5 times the throat diameter from the point of introduction of the feedstock.

Table I tabulates the dimension in inches of two reactors used to demonstrate the invention.

EXAMPLE

Carbon black production processes were carried out in comparative and inventive reactors having dimensions in inches indicated in Table I below. The zones indicated in Table I refer to FIG. 1.

inlets were located at 16 and 24 inches from the outlet of throat 28, and on the comparative reactor the inlets were at 8 and 16 inches from the throat outlet (upstream end of zone 34). Dimensions A and B indicated in Table II refer to the inlets most distant and nearest from the throat outlet respectively for each reactor.

TABLE II

|  | COMPARATIVE | | | | | INVENTIVE | |
|---|---|---|---|---|---|---|---|
|  | N375 | | N220 | | N375 | N220 | |
|  | 1 | 2 | 3 | 4 | 5 | 6 | 7 |
| Reactor Conditions | | | | | | | |
| Total Air, MSCFH | 253.8 | 264.1 | 249.3 | 249.3 | 228.7 | 228.8 | 229.2 |
| Nat. Gas, MSCFH | 15.8 | 17.5 | 16.5 | 16.1 | 15.6 | 15.6 | 15.9 |
| Oil, USGPH | 500 | 513 | 434 | 433 | 459 | 414 | 396 |
| BMCI | 127 | 127 | 127 | 127 | 127 | 129 | 129 |
| K-Solution, cc/min[a] | 59 | 16 | 50 | 0 | 11 | 285 | 10 |
| Oil Nozzle Angle,[b] | 60 | 60 | 60 | 60 | 60 | 60 | 60 |
| Oil Nozzle Position | A | B | A | B | B | A | B |
| Oil Nozzle Pressure, psig | 122 | 137 | 199 | 191 | 179 | 184 | 166 |
| Air Temp, °F. | 1199 | 1200 | 1163 | 1213 | 1177 | 1157 | 1142 |
| Combustion Heat Input, Btu/cf | 84 | 85 | 83 | 82 | 84 | 83 | 85 |
| Comb. Chamber Pres., psig | 3.4 | 3.5 | 3.8 | 3.5 | 5.2 | 5.4 | 5.3 |
| Quench Position, inches downstream of Throat Outlet | 64 | 64 | 78 | 78 | 70 | 70 | 70 |
| Yield, lb/gal | 5.24 | 5.31 | 5.02 | 5.03 | 5.38 | 5.40 | 5.33 |
| Reactor Product Properties | | | | | | | |
| CTAB[c], m$^2$/gm | 100 | 100 | 118 | 118 | 97 | 112 | 115 |
| DBP[d] | 126 | 122 | 128 | 134 | 132 | 143 | 127 |
| C-DBP[e] | 104 | 97 | 106 | 105 | 101 | 107 | 100 |
| Tint[f] | 113 | 114 | 119 | 121 | 113 | 117 | 121 |
| Tint Residual[g] | 6 | 5 | 4 | 6 | 6 | 5 | 6 |

[a]Aqueous 8 wt % KNO$_3$ added to feed oil
[b]Included angle of cone spray pattern
[c]ASTM D 3765-80
[d]ASTM D 2414-76
[e]ASTM D 3493-80
[f]ASTM D 3265-80
[g]Calculated, TR = Tint − [56.0 − 1.057 (CTAB) − 0.002745 (CTAB)$^2$ − 0.201 (N$_2$SA−CTAB)]

TABLE 1

|  | Inventive | Comparative |
|---|---|---|
| Cylindrical Zone 12 | | |
| Diameter | 21 | 21 |
| Length | 26.75 | 26.75 |
| Converging Zone 14 | | |
| Diameter adjacent zone 12 | 21 | 21 |
| Diameter adjacent zone 22 | 8 | 8 |
| Length | 18.5 | 18.5 |
| Cylindrical Zone 22 | | |
| Diameter | 8 | 8 |
| Length | 4 | 4 |
| Converging Zone 70 | | Not present |
| Diameter adjacent zone 22 | 8 | — |
| Diameter adjacent zone 28 | 7 | — |
| Cylindrical Zone 28 | | Not present |
| Diameter | 7 | — |
| Length (including converging zone 70) | 8 | — |
| Cylindrical Zone 34 | | |
| Diameter | 15 | 15 |
| Length (to quench position 40) | 60+ | 60+ |

Table II shows comparative operational data collected from the carbon black reactors above. One difference of the inventive reactor zones from the comparative reactor zones is that a 7-inch diameter Y-shaped section was inserted downstream of an 8-inch diameter throat in the comparative reactor. The inserted sections are indicated at 70 and 28 in FIG. 1. The purpose of shape Y insert was to improve the physical properties of the carbon black by increasing the velocity of the gases through the throat section.

Two sets of 4 radial oil injection nozzle ports were provided on each reactor. On the inventive reactor The inventive reactors and process runs illustrate a yield advantage over the comparative runs.

What is claimed is:

1. A process for producing carbon black comprising forming hot combustion gases flowing generally longitudinally along a reaction flow path by combusting fuel with oxidizing gas; flowing said hot combustion gases through a first generally cylindrical zone; converging said hot combustion gases in a converging zone to accelerate said hot combustion gases in a first stage to form once-accelerated hot combustion gases; flowing said once-accelerated hot combustion gases through a second generally cylindrical zone; flowing said once-accelerated hot combustion gases into a second stage where said combustion gases are further converged and accelerated to form twice-accelerated hot combustion gases; flowing said twice-accelerated hot combustion gases through a third generally cylindrical zone; forming a reactor throat flowing said twice-accelerated combustion gases into a third stage where abrupt deceleration occurs, and introducing carbonaceous feedstock generally radially inwardly into the first acceleration stage.

2. A process as in claim 1 further comprising contacting the abruptly decelerated hot combustion gases with a quench fluid to terminate the carbon forming reaction.

3. A process as in claim 1 wherein the deceleration occurs in a fourth generally cylindrical zone.

4. A process as in claim 3 further comprising maintaining the relationship between the volume of hot combustion gases and the reactor throat which is given by the relationship $10{,}000\ r^{2.3} \geq$ combustion gas flow rate $(SCFH) \geq 14{,}000\ r^{2.3}$, where r is the radius of the reactor throat measured in inches.

5. A process as in claim 4 wherein the first acceleration stage converges along a frustoconical path having an included cone angle in the range of from about thirty degrees to about ninety degrees, and the generally cylindrical reactor throat has a length in the range of from about 0.5 to 1.5 throat diameters.

6. A process as in claim 5 further comprising decelerating the hot combustion gases subsequent to the introduction of the carbonaceous feedstock at a distance in the range of from about 2 to about 5 reactor throat diameters from the point of introduction of the carbonaceous feedstock.

* * * * *

UNITED STATES PATENT AND TRADEMARK OFFICE
CERTIFICATE OF CORRECTION

PATENT NO. : 4,582,695

DATED : April 15, 1986

INVENTOR(S) : Meredith N. Dilbert et al

It is certified that error appears in the above-identified patent and that said Letters Patent is hereby corrected as shown below:

In Table II, Run 5 should have been under INVENTIVE, rather than under COMPARATIVE. Also in TABLE II, the values "5.4" and "5.3" given for "Comb. Chamber Pres., psig" for Runs 6 and 7, should have been deleted.

Col. 6, line 55, after "zone" delete ";". Col. 6, line 56, after "throat" insert ";". Col. 6, line 58, after "occurs", delete "," and substitute --- ; --- therefor.

Col. 7, lines 1 and 2, delete "$\geq$" and substitute "$\leq$" in both instances.

Col. 8, line 2, after "to", insert --- about ---.

Signed and Sealed this

Sixteenth Day of September 1986

[SEAL]

Attest:

DONALD J. QUIGG

Attesting Officer

Commissioner of Patents and Trademarks